US008650252B2

(12) United States Patent
Rubinstein et al.

(10) Patent No.: US 8,650,252 B2
(45) Date of Patent: Feb. 11, 2014

(54) INSTANTANEOUS RECOMMENDATION OF SOCIAL INTERACTIONS IN A SOCIAL NETWORKING SYSTEM

(75) Inventors: Yigal Dan Rubinstein, Los Altos, CA (US); Srinivas P. Narayanan, San Francisco, CA (US); Kent Schoen, San Francisco, CA (US); Yanxin Shi, Palo Alto, CA (US); David Dawei Ye, Palo Alto, CA (US); Andrey Goder, San Jose, CA (US); Levy Klots, San Francisco, CA (US); Robert Kang-Xing Jin, Palo Alto, CA (US); Alexey Spiridinov, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 41 days.

(21) Appl. No.: 13/247,825

(22) Filed: Sep. 28, 2011

(65) Prior Publication Data
US 2013/0080523 A1 Mar. 28, 2013

(51) Int. Cl.
*G06F 15/16* (2006.01)

(52) U.S. Cl.
USPC ........... 709/204; 709/206; 715/751; 715/755; 455/410

(58) Field of Classification Search
USPC ............ 709/204, 206; 715/751, 755; 455/410
See application file for complete search history.

(56) References Cited

U.S. PATENT DOCUMENTS

| | | | |
|---|---|---|---|
| 2008/0126476 A1* | 5/2008 | Nicholas et al. | 709/203 |
| 2010/0036912 A1* | 2/2010 | Rao | 709/204 |
| 2010/0125632 A1* | 5/2010 | Leonard | 709/204 |
| 2010/0250336 A1* | 9/2010 | Selinger et al. | 705/10 |
| 2011/0035384 A1* | 2/2011 | Qiu | 707/748 |
| 2011/0264596 A1* | 10/2011 | Shifflett | 705/319 |
| 2011/0282942 A1* | 11/2011 | Berger et al. | 709/204 |
| 2012/0054275 A1* | 3/2012 | Channell | 709/204 |
| 2012/0054666 A1* | 3/2012 | Baird-Smith et al. | 715/780 |
| 2012/0226651 A1* | 9/2012 | Chidlovskii | 706/52 |
| 2012/0278127 A1* | 11/2012 | Kirakosyan et al. | 705/7.29 |
| 2012/0303703 A1* | 11/2012 | Richter et al. | 709/204 |
| 2013/0073568 A1* | 3/2013 | Federov et al. | 707/749 |

OTHER PUBLICATIONS

U.S. Appl. No. 61/378,839, filed Aug. 2010, Baird-Smith et al.*

* cited by examiner

*Primary Examiner* — Jason K. Gee
*Assistant Examiner* — Sharif E Ullah
(74) *Attorney, Agent, or Firm* — Fenwick & West LLP

(57) ABSTRACT

As a user of a social networking system views a page that includes information provided by the system, certain types of social interactions are monitored. If an interaction monitored for is detected, at least one recommendation unit is identified to present to user on the page. The recommendation unit is identified based on a description of the interaction. The recommendation unit suggests that the user perform a social interaction in the social networking system. The recommendation unit is transmitted to a device of the user and is presented to the user on the page without having to reload the entire page.

20 Claims, 6 Drawing Sheets

INSTANTANEOUS RECOMMENDATION OF SOCIAL INTERACTIONS IN A SOCIAL NETWORKING SYSTEM

BACKGROUND

This invention relates generally to social networking systems, and in particular to recommending social interactions to users of a social networking system.

Social networking systems have become prevalent in recent years because they provide a useful environment in which users can connect to and communicate with other users. A variety of different types of social networking systems exist that provide mechanisms allowing users to interact within their social networks. However, current social networking systems do not provide a way of suggesting social interactions to a user that will be of interest to the user and enhance the user's experience with the social networking system. Typically, a user determines the social interactions to engage in on his own.

SUMMARY

Embodiments provide methods for presenting recommendation units to a user in response to a social interaction detected. In one embodiment, as a user of a social networking system views a page that includes information provided by the system, certain types of social interactions are monitored. The types of interactions monitored for may include postings by the user of content to share with at least one other user, the user interacting with postings of other users, and/or interactions that indicate a change in the user's geographic location.

If an interaction monitored for is detected, at least one recommendation unit is identified to present to user on the page. The recommendation unit is identified based on a description of the interaction. The recommendation unit suggests that the user perform a social interaction in the social networking system. The recommendation unit is transmitted to a device of the user and is presented to the user on the page without having to reload the entire page.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
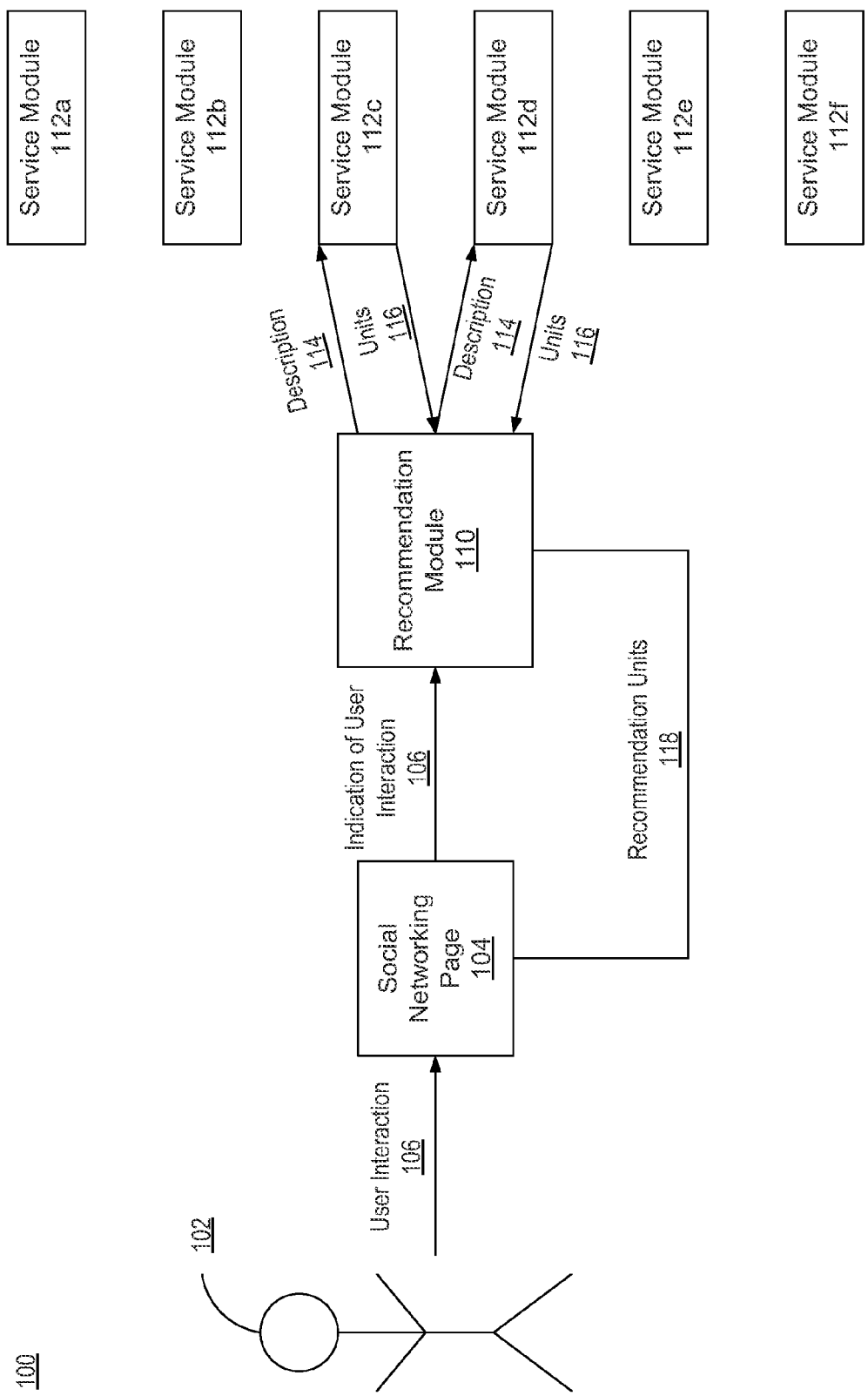
FIG. 1 is a diagram of a process for selecting recommendation units to display to a user according to one embodiment.

FIG. 1 is a diagram 100 of a process for selecting recommendation units to display to a user 102 (e.g., a member) of a social networking system according to one embodiment. In this embodiment, the user 102 is viewing a page 104 on a user device with content from the social networking system. For example, the page may be a news feed page that describes social interactions by users of the social networking system or a profile page of the user or another user of the system.

When the user 102 performs a certain interaction 106 with the page 104, an indication of the interaction 106 is sent to a recommendation module 110, which is part of the social networking system. The user interaction 106 may be, for example, the user posting a status update or the user liking, commenting on, or otherwise interacting with another user's post. The recommendation module 110 determines which recommendation units 118 to display to the user 102 based on the user interaction 106. A recommendation unit 118 suggests to a user a social interaction that the user should perform in the social networking system. For example, a recommendation unit 118 may suggest that the user become friends with a specific user or join a certain group.

To determine which recommendation units 118 to display to the user 102, the recommendation module 110 selects one or more service modules 112, from multiple service modules 112a-f, from which to request recommendation units 118. In one embodiment, the service modules 112 are part of the social networking system, but they may also be outside the social networking system and operated by third parties. Each service module 112 is associated with a certain type of social interaction in the social networking system and provides recommendation units that suggest that type of interaction. For example, service module 112a may provide recommendation units 118 that suggest that a user become friends with other users, service module 112b may provide recommendation units 118 that suggest that a user tag friends in a photo, and service module 112c may provide recommendation units that suggest that a user join a group or like a page. In one embodiment, the service modules 112 are selected based on a score that is calculated for each of the multiple service modules 112. In this example, the selected service modules are modules 112c and 112d.

The recommendation module 110 provides a description 114 of the user interaction 106 to each selected service module 112 (in this example, modules 112c and 112d). In response to receiving the description 114, service modules 112c and 112d provide multiple recommendation units 116 to the recommendation module 110. Each service module 112 determines which recommendation units 116 to provide based on the description 114 and/or information about the user 102. As a result, the recommendation units 116 are directly relevant to the interaction 106 that had just been performed by the user 102.

The recommendation module 110 selects one or more recommendation units 118 to present to the user 102 from the multiple recommendation units 116 received from service modules 112c and 112d. The recommendation units 118 may be selected based on a score that is calculated for each of the multiple units 116. In one embodiment, the number of recommendation units 118 selected is equal to a number of slots available on the page 104 for recommendation units.

The recommendation module 110 transmits the selected recommendation units 118 to the user's device, where the page 104 is displayed. In one embodiment, a portion of the page 104 is updated to include the selected recommendation units 118 in the page 104 without actually reloading the page 104. Instead, the portion of the page 104 that is updated is the portion where the recommendation units 118 are placed. Thus, the process of FIG. 1 is triggered by an interaction 106 with the social networking system and results in the page 104 being updated almost instantly with recommendation units 116 that are relevant to the interaction 106.

Architecture

Figure 2:
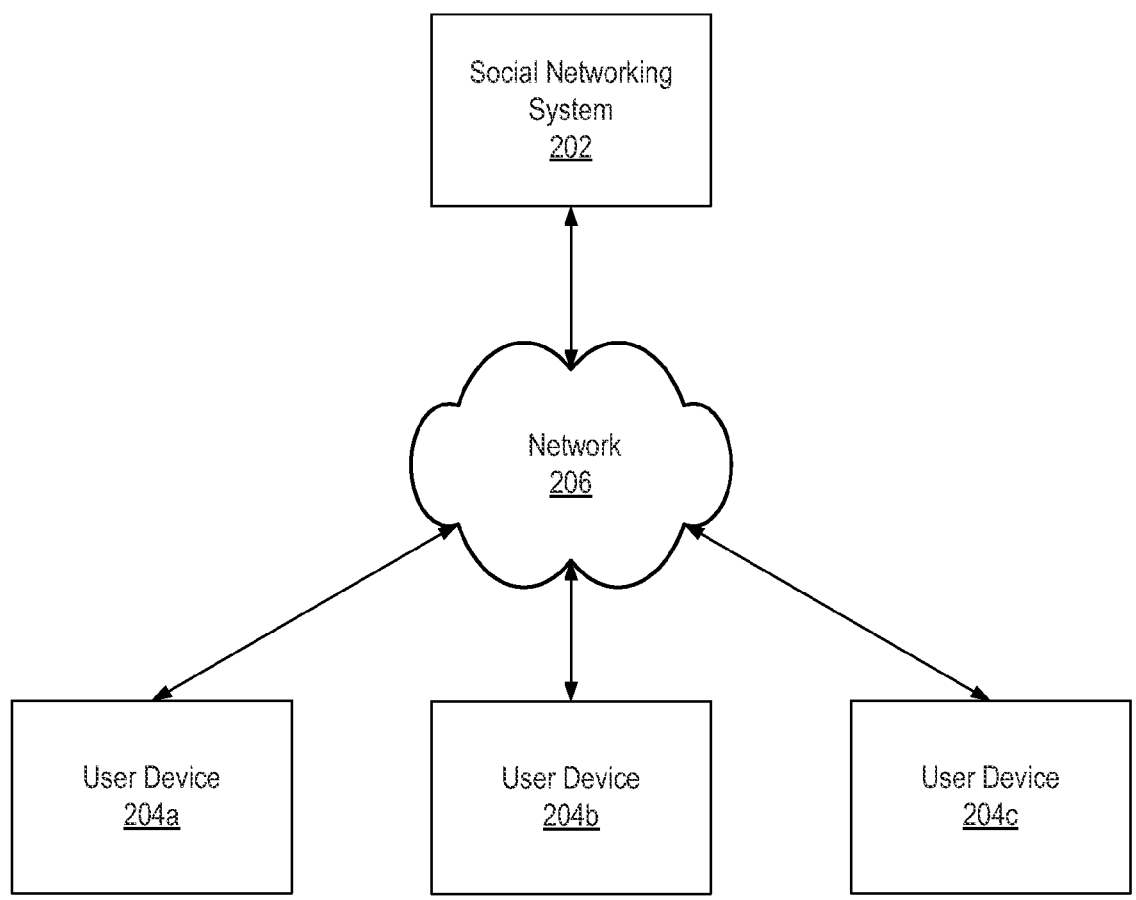
FIG. 2 is a diagram of a social networking system environment according to one embodiment.

FIG. 2 is a diagram of a social networking system environment 200 according to one embodiment. The environment 200 includes a social networking system 202 and user devices 204 connected by a network 206. For purposes of illustration, FIG. 2 includes only three user devices 204. However, the social networking system environment 200 may include more user devices 204 than those shown in FIG. 2 (e.g., millions of user devices 204).

The user devices 204 each comprise one or more computing devices that can receive inputs from a user and can transmit and receive data via the network 206. For example, a user device 204 may be a desktop computer, a laptop computer, a smart phone, a personal digital assistant (PDAs) or any other device including computing functionality and data communication capabilities. A user device 204 is configured to communicate with the social networking system 202 via the network 206, which may comprise any combination of local area and/or wide area networks, using both wired and wireless communication systems.

The user devices 204 display pages that include content (i.e., information) received from the social networking system 202. In one embodiment, the pages are webpages that are viewed using a web browser. In one embodiment, the pages are interfaces generated by an application installed on a user device 204 (e.g., a mobile application). In one embodiment, the application is downloaded by a user device 204 directly from the social networking system 202. In another embodiment, the application is downloaded by a user device 204 from a third party system (e.g., an online application distribution system, such as a mobile application store).

In one embodiment, a page displayed on a user device 204 can send data to and receive data from the social networking system 202 asynchronously without interfering with the display of the page. In other words, a displayed page can asynchronously update a portion of the page's content without having to reload the entire page. In one embodiment, this technology is implemented using a group of technologies referred to as AJAX (asynchronous JavaScript and XML).

The social networking system 202 comprises one or more computing devices that store one or more social networks. Each social network includes multiple users. According to various embodiments, the social networking system 202 may include a website, or alternatively a server that can be accessed through the network 206 by user devices 204.

The social networking system 202 allows users of system 202 to communicate and interact with other users of the system 202. Users that join the social networking system 202 can establish connections (i.e., relationships or associations) with other users of the social networking system 202 to whom they desire to be connected. As used herein, the term "friend" refers to any other user of the social networking system 202 with whom a user established a connection via the social networking system 202. In one embodiment, connections between users are established at the request of at least one user. In one embodiment, connections between uses are established automatically by the social networking system 202 based on common characteristics between the users (e.g., users who are alumni of the same educational institution).

Connections between users in the social networking system 202 are typically bilateral connections (i.e., connections in both directions). However, connections may also be unilateral connections (i.e., connections in one direction). For example, if Bob and Joe are both users of the social networking system 202 and connected to each other, Bob and Joe are connected to each other (i.e., they share a bilateral connection). On the other hand, if Bob wishes to connect to Joe to view data provided by Joe to system 202 but Joe does not wish to form a mutual connection, a unilateral connection may be established from Bob to Joe. In one embodiment, connections between users are direct connections. In other embodiments, a connection may be indirect via one or more levels of connections or degrees of separation.

In one embodiment, the social networking system 202 monitors for certain types of social interactions by users in the social networking system 202. When an interaction monitored for is detected, the social networking system 202 identifies recommendation units that are related to the interaction that just occurred. The identified recommendation units are transmitted to a user device 204 and presented to the user. Details of this process are described below.

Figure 3:
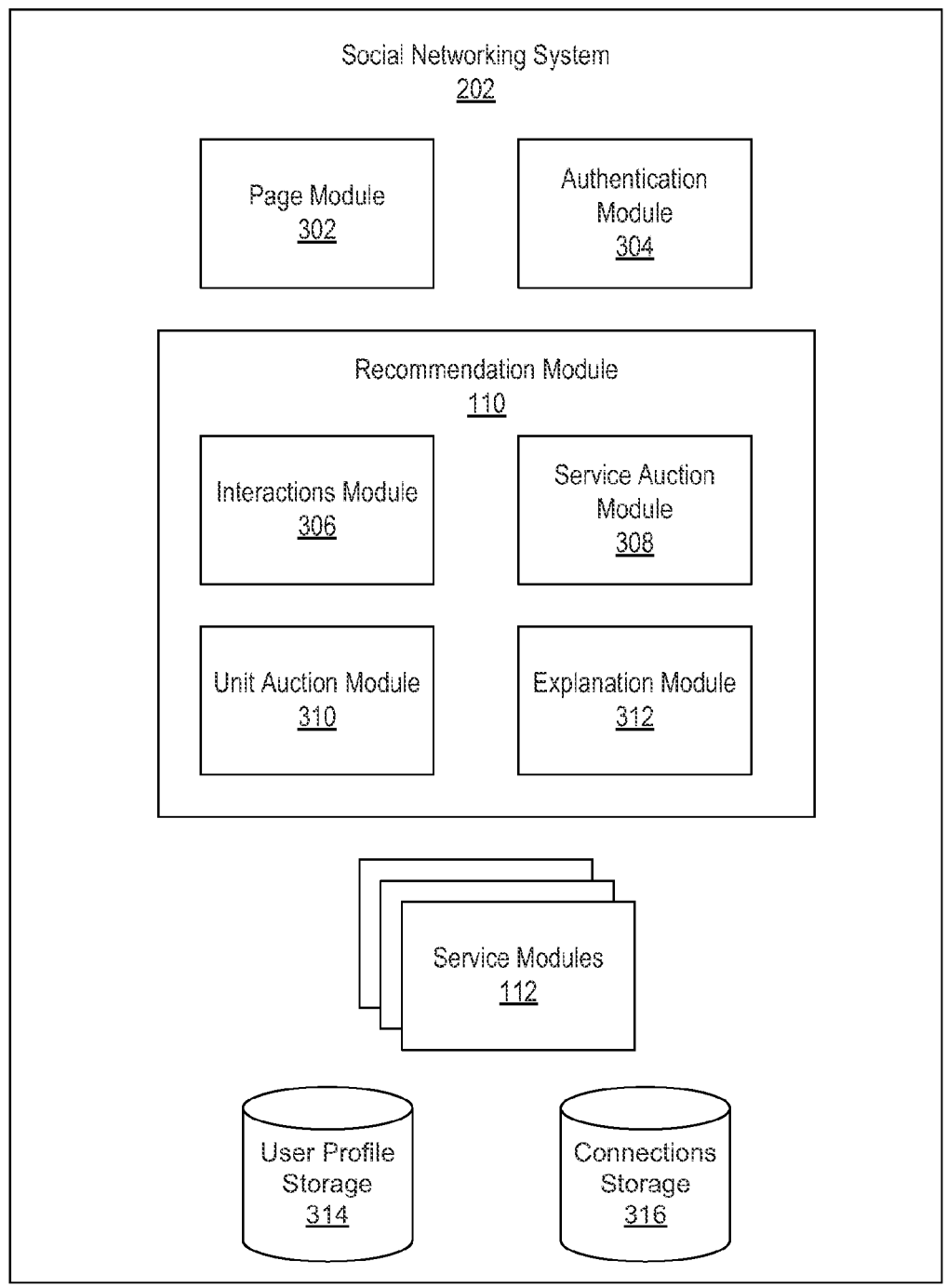
FIG. 3 is a diagram illustrating a detailed view of a social networking system according to one embodiment.

FIG. 3 is a diagram illustrating a detailed view of the social networking system 202 according to one embodiment. The social networking system 202 includes a page module 302, an authentication module 304, a recommendation module 110, service modules 112, a user profile storage 314, and a connections storage 316. In other embodiments, the social networking system 202 may include additional, fewer, or different modules for various applications. Conventional components such as network interfaces, security mechanisms, failover servers, management and network operations consoles, and the like are not shown so as to not obscure the details of the system 202.

The user profile storage 314 stores profiles of users of the social networking system 202. A user profile includes information about its respective user. In one embodiment, user profiles include biographic, demographic, and other types of descriptive information of their respective user, such as work experience, educational history, hobbies, preferences, interests, relationship information, location, and the like. A user profile may additionally include one or more of the following: pictures provided to the system 202 by the user or other users, a listing of the user's friends, postings by other user on the user's profile, and a listing of activities that the user has engaged in through the social networking system 202 (e.g., posting status updates, sharing links and videos, etc.).

In one embodiment, the user profile storage 314 includes data structures with fields suitable for describing a user's profile. In one embodiment, when a user becomes a user of the social networking system 202, the social networking system 202 generates a new instance of a user profile in the user profile storage 314, assigns a unique identifier to the user profile, and begins to populate the fields of the user profile with information provided by the user.

The connections storage 316 stores data describing one or more connections between different users of the social networking system 202. The connection information stored in the connections storage 316 may indicate users who have similar or common work experience, group memberships, hobbies, educational history, or are in any way related or share common attributes. Additionally, the connections storage 316 includes user-defined connections between different users of the system 202, allowing users to specify their relationships with other users. For example, user-defined connections allow users to generate relationships with other users that parallel the users' real-life relationships, such as friends, co-workers, relatives, and so forth. Users may select from predefined types of connections, or define their own connection types as needed. In one embodiment, when a user establishes a connection with another user, the users automatically become friends.

In one embodiment, the connections storage 316 includes data structures suitable for describing a user's connections to other users. In one embodiment, the connections storage 316 also associates a connection type with a user's connections, which may be used in conjunction with the user's privacy setting, to regulate access to the user's information.

The page module 302 links the social networking system 202 to the user devices 204 via the network 206. The page module 302 links the system 202 and the devices 204 by transmitting content stored on the system 202 to the devices 204. The page module 302 determines which content to transmit to a user device 204 based on requests received from the device 204. In one embodiment, the page module 302 transmits content to the user devices 204 by serving webpages to the devices 204. In one embodiment, the content transmitted to a user device 204 is included in a page loaded by an application installed on the device 204 (e.g., loaded by an application of a mobile device).

The authentication module 304 authenticates users seeking to access content stored on the social networking system 202. In one embodiment, the authentication module 304 maintains authentication information for each user that has signed up to use the system 202. In one embodiment, the authentication information includes a user identifier and a password. In one embodiment, the identifier is the user's email address.

In one embodiment, when a user attempts to communicate with the social networking system 202, if the user is not logged in, the authentication module 304 has the user's device 204 present a login page to the user. In the login page, a user that has previously signed up to use the system 202 can enter their respective authentication information. When the authentication information is entered, the authentication module 304 verifies that information is valid. If the information is valid, the user is logged in to the social networking system 202. In one embodiment, a user can setup their device 204 to automatically log them in. In one embodiment, when a user logs in, the authentication module 304 stores an Internet Protocol (IP) address of the device 204 used by the user to login. For each user, the authentication module 304 maintains a history of IP addresses used by the user to login.

If a user has not previously signed up with the system 202, in the login page the user can request to sign up. If the user request to sign up, the authentication module 304 has the user go through a sign up process. In one embodiment, the sign up process consists of the user providing the authentication module 304 with authentication information that user wishes to use to login, personal information, and information for the user's profile.

The recommendation module 110 includes an interactions module 306, a service auction module 308, a unit auction module 310, and an explanation module 312. The interactions module 306 monitors for certain types of social interactions by users. In one embodiment, the interactions module 306 monitors for certain types of interactions with pages that include content from the social networking system 202. In one embodiment, a type of interaction with pages monitored for by the interactions module 306 is postings by a user of content to share with at least one other user of the system 202. For this type of interaction, the interactions module 306 may monitor for the receipt of one or more of the following from a user device 204: content to share as the user's current status; an update to the user's profile (e.g., change in relationship status or employment status); content from the Internet to share (e.g., a news article, video, or photo); a personal photo or video to share along with its caption; a comment on another user's communication; and a location where the user is currently located (i.e., checking in). In one embodiment, these postings are included as part of the user's profile.

In one embodiment, a type of interaction with pages monitored for by the interactions module 306 is a user's interactions with postings of other users of the social networking system 202. The postings may be another user's profile, comment, status, question, picture, video, event, shared content, etc. For this type of interaction, the interactions module 306 may monitor for the receipt of one or more of the following from a user device 204: a request to attend another user's event; a request to follow a user; an indication of having affinity towards another user's posting (i.e., liking another user's status, page or profile); and a request to view another user's posting (e.g., a request to view a user's profile).

In one embodiment, a type of interaction with pages monitored for by the interactions module 306 includes interactions that indicate a change in a user's geographic location. In one embodiment, in order to be considered a change in location, the user's city, state, or country must change. In another embodiment, to be considered a change in location, the user's location must change by at least a certain number of miles (e.g., 200 miles). In one embodiment, for this type of interaction, the interactions module 306 monitors for the receipt of a request to change the user's location in the user's profile (e.g., request to change the user's resident city). In one embodiment, the interactions module 306 monitors for the receipt of a request to login from a location that is different from the user's previous login location. In one embodiment, the interactions module 306 determines whether there has been a change in login location based on the IP addresses of the login locations. As described above, the authentication module 304 keeps track of the IP addresses from where a user checks in. In one embodiment, the interactions module 306 monitors for the receipt of a request to check-in from a location that is different from the user's previous check-in location or the user's resident location.

When an interaction monitored for is detected, the interactions module 306 creates a description of the interaction. In one embodiment, if the interaction detected is a posting of content by a user, the interactions module 306 includes in the description information related to the posting and possibly the content of the posting. For example, if the user checks in at a restaurant, the interactions module 306 may include in the description the name of the restaurant as well as other information related to the restaurant such as the type of food sold at the restaurant (e.g., Italian, Mexican) and the location of the restaurant.

In one embodiment, if the interaction detected is a user interacting with another user's posting, the interactions module 306 includes in the description information related to the other user's posting and possibly content of the posting. For example, if a user indicates that he likes another user's status, which states "I love hiking," the interactions module 306 may include in the description "I love hiking."

In one embodiment, when content of a posting is included in a description, only words that appear frequently in the content are included in the description. In one embodiment, certain stop words, such as "the" and "a" are removed from content of a posting and the remaining words are included in a description.

In one embodiment, if the interaction detected is an interaction that indicates a change in a user's geographic location, the interactions module 306 include in the description the user's current geographic location as well as information related to the current location (e.g., information on a business at that location). In one embodiment, the interactions module 306 additionally includes the user's prior location.

The service auction module 308 requests recommendation units from service modules 112. When the interactions module 306 detects a social interaction monitored for, the service auction module 308 runs a service level auction to select one or more service modules 112 from a plurality of service modules 112 from which to request recommendation units. The service auction module 308 requests recommendation units from those service modules 112 that are likely to provide recommendation units that are of interest to a user. In other words, the service auction module 308 predicts which service modules are likely to provide recommendation units that are of interest to the user. Filtering the service modules 112 from which units are requested, instead of requesting units from all the modules 112, allows recommendation units to be presented to a user quicker and allows for more efficient use of the system's resources.

To select the service modules 112, the service auction module 308 identifies the user that engaged in the detected interaction. For each of the plurality of service modules 112, the service auction module 308 calculates a score for the service module 112 based on the user. In one embodiment, the plurality of service modules 112 includes all the service modules 112 available. In one embodiment, the score is calculated according to the following formula:

Service Module Score=eCTR×biasing value

The eCTR, or expected click through rate, is a value that represents a likelihood that the user will click on (i.e., select) recommendation units provided by a particular service module 112. In one embodiment, the service auction module 308 calculates the eCTR based on a probabilistic model. In one embodiment, the probabilistic model is a machine learned model. In one embodiment, the model is trained using historical click through activity as a function of a number of input signals, such as information about users to whom recommendation units from the service module 112 were presented and the context in which they were presented.

The biasing value in this equation represents how valuable it is to the social networking system 202 for the user to convert on recommendation units provided by that particular service module 112. As described above, each service module 112 provides recommendation units that suggest a specific type of social interaction in the social networking system 202. Certain types of interactions may be more valuable to the social networking system 202 than others. For example, a user becoming friends with another user may be more valuable to the system 202 than a user viewing a friend's photo. The friending type of social interactions may be more valuable because becoming friends can lead to an unlimited number of other interactions, such as the users posting on each others' walls and tagging of each other in photos. In contrast, viewing a friend's photo may lead to a limited number of social interactions.

In one embodiment, the service auction module 308 calculates the biasing value by multiplying a global value and a bid. The global value represents how valuable it is to the social networking system 202 for users in general to convert on the particular type of recommendation units provided by the service module 112. The bid is a value that represents how valuable it is to the social networking system 202 for the specific user to convert on the particular type of recommendation units provided by the service module 112. In this way, the biasing value may be fixed or it may be a function of information about the user. For example, a recommendation unit suggesting new friend may be much more valuable if the user has just a few friends than if the user has hundreds, since the user with many more friends does not need to be encouraged to make friends in the social networking system 202. Accordingly, the bid component of the biasing value may increase as the user's number of friends decreases. By depending on a specific user and/or the user's activities this allows the biasing value to be dynamic.

Figure 6:
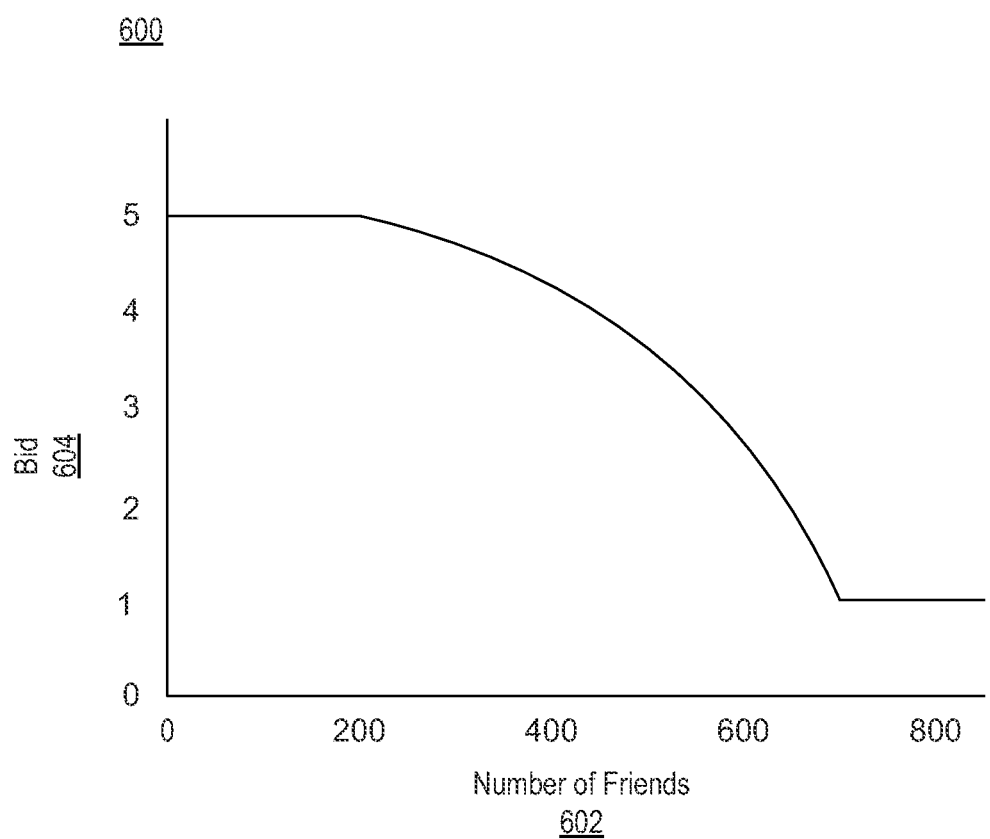
FIG. 6 is a graph that illustrates how a bid value for a user can vary based on the user's number of friends according to one embodiment.

FIG. 6 is a graph 600 that illustrates how a bid value for a user can vary based on the number of friends of the user. The x-axis 602 in the graph 600 represents the number of friends. The y-axis 604 represents the bid based on the number of friends. As can be seen in the graph 600, as the number of friends that the user has increases, the bid decreases.

Once the service auction module 308 calculates a score for each of the multiple service modules 112, the service auction module 308 selects one or more of the service modules 112 for providing one or more recommendation units. In one embodiment, a certain number of service modules 112 with the highest scores are selected. In one embodiment, the number of selected service modules 112 is less than the total number of service modules 112 available. A request for recommendation units is sent to each selected service module 112 along with a description created by the interactions module 306 for the detected interaction.

The unit auction module 310 determines which recommendation units to present to a user. When the service auction module 308 requests recommendation units from selected service modules 112 based on a detected social interaction, the unit auction module 310 receives the multiple recommendation units provided by the selected service modules 112. Some service modules 112 may provide multiple units, whereas others may provide none. From the multiple recommendation units received from the modules 112, the unit auction module 310 selects one or more recommendation units to present to the user based on a prediction of which recommendation units will be of interest to the user or will be acted on by the user.

The unit auction module 310 selects the recommendation units by running a unit level auction (i.e., a second auction). As part of this auction, the unit auction module 310 calculates a score for each of the multiple recommendation units received. In one embodiment, the score is calculated according to the following formula:

Recommendation Unit Score=eCTR×biasing value

The eCTR and biasing value of this equation are similar to those described above, except that these are determined for each recommendation unit instead of for each service module 112. In this equation the eCTR is a value that represents the likelihood that the user will click on that specific recommendation unit. In one embodiment, the eCTR is determined based on a probabilistic model. In one embodiment, the probabilistic model is a machine learned model. In one embodiment, the model is trained using historical click through activity as a function of a number of input signals, such as information about users to whom the specific recommendation unit has been presented and the context in which it was presented.

The biasing value in this equation represents how valuable it is to the social networking system 202 for the user convert on the recommendation unit. In one embodiment, the unit auction module 310 calculates the biasing value by multiplying a global value and a bid. The global value represents how valuable it is to the social networking system 202 for users in general to convert on the recommendation unit. The bid is a value that represents how valuable it is to the social networking system 202 for the specific user to convert on the recommendation unit.

Based on the score calculated for each recommendation unit received from the selected service modules 112, the unit auction module 310 selects one or more recommendation units that will be presented to the user. In one embodiment, the number of recommendation units selected is equal to the number of slots available on a page where the units will be presented. In one embodiment, recommendation units with the highest scores are selected. In one embodiment, the number of recommendation units selected is less than the number of recommendation units received from the selected service modules 112.

The explanation module 312 transmits recommendation units to user devices 204 for presentation. When the unit auction module 310 selects recommendation units to present to a user, the explanation module 312 determines an explanation to present to the user with the recommendation units. The explanation describes to the user why the units are being presented. In one embodiment, the explanation is determined by explanation module 312 based on the logic used to select the recommendation units to present. In one embodiment, the explanation is determined by explanation module 312 based on the social interaction that triggered the process in which the recommendation units were obtained, as described above.

For example, if the user posted a status of "I will never get rid of my classic 1985 BMW M3," this may trigger the presentation of recommendation units to the user about the post. For example, one recommendation unit selected by the unit auction module 310 may be a suggestion to join a group of BMW M3 enthusiasts and another unit selected may suggest that the user view a photo of his friend's M3. The explanation determined by the explanation module 312 to include with the units may be a statement such as, "These units are being presented because you just posted a status update regarding a BMW M3."

In one embodiment, the explanation module 312 determines one explanation for all the units selected. In another embodiment, the explanation module 312 determines an explanation for each unit selected.

The explanation module 312 transmits the subset of recommendation units to the user's device 204 along with the determined one or more explanations. If the detected interaction that triggered identifying the units did not cause a new page to be loaded, the recommendation units and the explanations are presented to the user on the page where the interaction occurred. Only a portion of the page is updated to include the units and the explanations, so that the entire page is not reloaded. In one embodiment, this is accomplished using AJAX. On the other hand, if the detected user interaction triggered a new page to be loaded, the units and explanations are loaded with the new page. Although selecting which recommendation units to present to a user includes a number of steps, it should be understood that to the user the presentation of the recommendation units may be nearly instantaneous after the social interaction is detected.

The service modules 112 as described above are each associated with a certain type of social interaction in the social networking system 202. Each service module 112 stores recommendation units that suggest interactions of the type with which it is associated. In one embodiment, the recommendation units stored in the service modules 112 each include metadata that describes the unit. The service modules 112 of the system 202 may include one or more of the following service modules 112: a people you may know module, a group module, a page module, a photo module, a video module, a places module, a questions module, and an events module.

The people you know module provides recommendation units that suggest to a user to become friends with or otherwise establish a connection to another user of the social networking system 202. The recommendation units provided by the group module suggest to a user a group in the system 202 that the user should join. In one embodiment, each group is associated with a certain topic and consists of users of the system 202 interested in that topic. The recommendation units provided by the page module suggest to a user a page in the system 202 of another user that the user should view, comment on, like, or otherwise interact with. For example, a recommendation unit may suggest that the user like the page of a certain music band or business. The photo module provides recommendation units that suggest to a user a photo that the user should view, tag a friend in, comment on, classify, or otherwise interact with. In one embodiment, the photos are personal photos shared by other users. Similar to the photo module, the video module provides recommendation units that suggest to a user a video that he/she should watch or otherwise interact with. The units provided by the places module recommend a place, such as a business, that the user should visit. In one embodiment, the social networking system 202 stores a page or profile for each place. The questions module provides units that ask a user a question and receives an answer from the user. In one embodiment, the questions are posted by other users. The events module provides units that suggest to a user an event that the user should attend. In one embodiment, the events are public events created by other users.

When a service module 112 receives a description of a detected social interaction, the service module 112 searches its stored recommendation units for units that match the description. In one embodiment, to determine whether a recommendation unit matches the description, the service module 112 compares the description to the metadata of the unit. The service module 112 transmits the matching units found to the recommendation module 110. Therefore, since the units to transmit are identified using a description of a detected interaction, the transmitted units are directly related to the detected interaction.

Process

Figure 4:
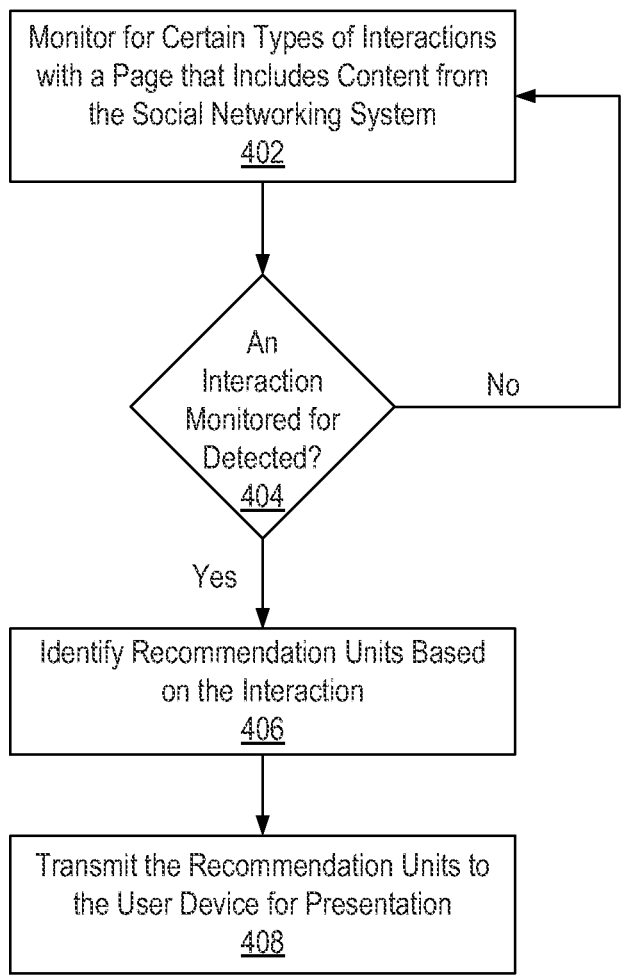
FIG. 4 is a flow diagram of a process for suggesting recommendation units to a user according to one embodiment.

FIG. 4 is a flow diagram 400 of a process performed by the recommendation module 110 for suggesting recommendation units to a user according to one embodiment. Assume for purposes of this example that a user on a device 204 is viewing a page with content provided by the social networking system 202.

The recommendation module 110 monitors 402 for certain types of interactions with the page. In one embodiment, the types of interaction that the recommendation module 110 monitors for include a posting by the user of content to share with at least one other user of the system 202; the user liking, commenting on, or otherwise interacting with a posted content item of another user of the system 202; and/or an interaction that indicates a change in the user's geographic location.

If an interaction monitored for is detected 404, the recommendation module 110 identifies 406 recommendation units to present to the user. The recommendation units are identified based on the detected interaction. The recommendation module 110 transmits 408 the identified units to the user device 204 so that they can be presented as part of the page. In this embodiment, the selected units are displayed in the page without the user's device having to reload the entire page.

Figure 5:
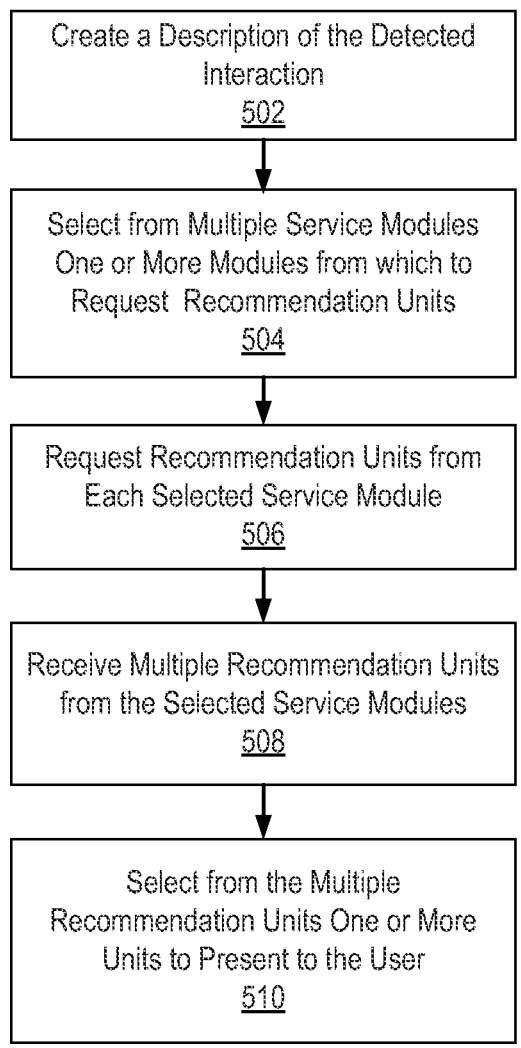
FIG. 5 is a flow diagram of a process for identifying recommendation units to suggest to a user according to one embodiment.

FIG. 5 is a flow diagram of the step of identifying 406 the recommendation units to present to the user, as shown in FIG. 4. In this embodiment, the recommendation module 110 creates 502 a description of the detected interaction. The recommendation module 110 selects 504, from multiple service modules 112, one or more service module 112 from which to request recommendation units. The recommendation module 110 selects the one or more modules 112 based on a score that is calculated for each of the plurality of service module 112. In one embodiment, a score for a service module 112 is calculated based on the likelihood that the user will convert on units provided by that service module and the value to the system 202 for the user to convert on those units.

The recommendation module 110 requests 506 recommendation units that match the description from each selected service module 112. The recommendation module 110 receives 508 multiple recommendation units from the selected service modules 112. The recommendation module selects 510 from the multiple recommendation units one or more recommendation units to present to the user. To select the one or more units, the recommendation module 110 calculates a score for each of the recommendations unit. In one embodiment, a score for a recommendation unit is calculated based on the likelihood that the user will convert on the unit and the value to the system 202 for the user to convert on the unit.

Although the recommendation units have been described as suggesting social interactions in the social networking system 202, in other embodiments the recommendation units may be advertisements. In one embodiment, if a user converts on an advertisement, the user's device 204 is directed to a page hosted by an advertiser associated with the advertisement (e.g., the advertiser's home webpage).

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A computer-implemented method comprising:
    detecting a posting by a user of content to share with one or more other users of a social networking system, the posting occurring by the user interacting with a page that includes information from the social networking system;
    responsive to detecting the posting, identifying a plurality of recommendation units based on a description of the posting, each of the plurality of recommendation units suggesting that the user perform a social interaction in the social networking system;
    calculating for each of the plurality of recommendation units a score based on a value to the social networking system for the user to perform the social interaction suggested by the recommendation unit;
    selecting a number of recommendation units from the plurality of recommendation units based on the calculated scores; and
    sending the selected recommendation units for presentation to the user within the page in which the posting occurred without reloading the page in its entirety, wherein the presentation of the recommendation units is initiated responsive to the detection of the posting.

2. The method of claim 1, wherein the detected posting includes at least one of:
    updating a current status of the user, updating a social network profile of the user, sharing content from the Internet, sharing a personal photo or video, commenting on a communication of another user, updating a location where the user is located.

3. The method of claim 1, wherein the description includes at least a portion of the content of the posting.

4. The method of claim 1, wherein the social interaction suggested by at least one of the plurality of recommendation units is at least one of: that the user become friends with another user, that the user join a social networking group, that the user view a page of another user, that the user view a photo of another user, that the user view a video of another user, that the user answer a question, and that the user attend an event.

5. The method of claim 1, further comprising:
   determining, for at least one of the selected recommendation units, an explanation that explains that the recommendation unit is being presented to the user because of the detected posting; and
   sending the explanation for presentation to the user within the page in which the posting occurred.

6. The method of claim 1, wherein the selected recommendation units are presented within the page using AJAX.

7. The method of claim 1, wherein the posting is included as part of a social network profile of the user in the social networking system.

8. The method of claim 1, wherein the page is a profile of the user in the social networking system.

9. The method of claim 1, wherein the page is a news feed page that describes social interactions by users of the social networking system.

10. A computer-implemented method comprising:
    detecting an interaction by a user with a posting of an additional user of a social networking system, the interaction occurring within a page that includes content from the social networking system;
    responsive to detecting the interaction, identifying a plurality of recommendation units based on a description of the posting, each of the plurality of recommendation units suggesting that the user perform a social interaction in the social networking system;
    calculating for each of the plurality of recommendation units a score based on a value to the social networking system for the user to perform the social interaction suggested by the recommendation unit;
    selecting a number of recommendation units from the plurality of recommendation units based on the calculated scores; and
    sending the selected recommendation units for presentation to the user within the page in which the interaction occurred without reloading the page in its entirety, wherein the presentation of the recommendation units is initiated responsive to the detection of the interaction.

11. The method of claim 10, wherein the posting of the additional user is at least one of: a profile, comment, status, question, picture, video, event, and shared content.

12. The method of claim 10, wherein the detected interaction includes at least one of:
    indicating that the user will attend an event of the additional user, requesting to follow the additional user, indicating affinity towards the posting, and requesting to view the posting.

13. The method of claim 10, wherein the description includes content of the posting.

14. The method of claim 10, further comprising:
    determining, for at least one of the selected recommendation units, an explanation that explains that the recommendation unit is being presented to the user because of the detected interaction; and
    sending the explanation for presentation to the user within the page in which the interaction occurred.

15. A computer-implemented method comprising:
    detecting an interaction by a user with a page that includes content from a social networking system, wherein the interaction indicates a change in a current geographic location of the user;
    responsive to detecting the interaction, identifying a plurality of recommendation units based on a description of the interaction, each of the plurality of recommendation units suggesting that the user perform a social interaction in the social networking system;
    calculating for each of the plurality of recommendation units a score based on a value to the social networking system for the user to perform the social interaction suggested by the recommendation unit;
    selecting a number of recommendation units from the plurality of recommendation units based on the calculated scores; and
    sending the selected recommendation units for presentation to the user within the page with which the interaction occurred without reloading the page in its entirety, wherein the presentation of the recommendation units is initiated responsive to the detection of the interaction.

16. The method of claim 15, wherein the detected interaction is the user changing a user location in a profile of the user.

17. The method of claim 15, wherein the detected interaction is the user logging in from the current geographic location that is different from a prior geographic location of the user.

18. The method of claim 15, wherein the description of the interaction includes at least one of: the current geographic location of the user, information related to the current geographic location, and a prior location of the user.

19. The method of claim 1, wherein the selected recommendation units are presented to the user without a device operated by the user being directed to another page responsive detecting the posting.

20. The method of claim 10, wherein the selected recommendation units are presented to the user without a device operated by the user being directed to another page responsive detecting the posting.

* * * * *